United States Patent
Saitou et al.

(10) Patent No.: US 10,040,942 B2
(45) Date of Patent: Aug. 7, 2018

(54) PROCESS FOR PRODUCING QUINACRIDONE PIGMENT COMPOSITION

(71) Applicant: DIC Corporation, Tokyo (JP)

(72) Inventors: Shingo Saitou, Sakura (JP); Hideki Okabe, Sakura (JP); Yukiko Higuchi, Kamisu (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/554,898

(22) PCT Filed: May 12, 2016

(86) PCT No.: PCT/JP2016/064142
§ 371 (c)(1),
(2) Date: Aug. 31, 2017

(87) PCT Pub. No.: WO2016/208292
PCT Pub. Date: Dec. 29, 2016

(65) Prior Publication Data
US 2018/0037741 A1    Feb. 8, 2018

(30) Foreign Application Priority Data

Jun. 24, 2015 (JP) .................................. 2015-126577

(51) Int. Cl.
| C09D 11/322 | (2014.01) |
| C09D 11/30 | (2014.01) |
| C09B 48/00 | (2006.01) |
| C09D 11/037 | (2014.01) |

(52) U.S. Cl.
CPC ............ C09B 48/00 (2013.01); C09D 11/037 (2013.01)

(58) Field of Classification Search
CPC ........ C09D 11/322; C09D 11/30; C09D 11/40
USPC .............................. 106/31.6, 31.13; 347/100
See application file for complete search history.

(56) References Cited

U.S. PATENT DOCUMENTS

| 8,449,096 B2 * | 5/2013 | Birau ................... C09D 11/322 347/100 |
| 2013/0050364 A1 | 2/2013 | Imamura et al. |

FOREIGN PATENT DOCUMENTS

| JP | 02-038463 A | 2/1990 |
| JP | 05-230384 A | 9/1993 |
| JP | 2002-146224 A | 5/2002 |
| JP | 2008-156524 A | 7/2008 |
| JP | 2013-53174 A | 3/2013 |
| JP | 2014-31443 A | 2/2014 |

OTHER PUBLICATIONS

International Search Report dated Jun. 14, 2016, issued for PCT/JP2016/064142.

* cited by examiner

*Primary Examiner* — Charanjit Aulakh
(74) *Attorney, Agent, or Firm* — Locke Lord LLP

(57) ABSTRACT

A process for the production of a quinacridone pigment composition is provided. For use in environmentally friendly inks, the pigment composition offers high chroma, high color strength, and high dispersion stability. Also provided is a water- or alcohol-based environmentally friendly ink that contains a quinacridone pigment composition obtained through this process. According to the inventors' research, adding a quinacridone derivative to a quinacridone solid solution in two different steps in a process, during and after treatment for the control of crystals, gives the resulting pigment composition the color characteristics of high color strength and high chroma, as well as high dispersion stability. The present invention is based on these findings.

6 Claims, 4 Drawing Sheets

PROCESS FOR PRODUCING QUINACRIDONE PIGMENT COMPOSITION

TECHNICAL FIELD

The present invention relates to a process for the production of a quinacridone pigment composition for environmentally friendly inks.

BACKGROUND ART

Conventional offset-printing inks contain petroleum solvent, a solvent derived from petroleum distillates. However, problems have been pointed out with petroleum solvents, such as the exhaustion of the oil resources and harm to the work environments in which they are used.

The offset ink industry is accelerating the reduction of VOC (volatile organic compounds) emissions to make inks friendlier to the environment, less damaging to the air and less harmful to the human body for example. The mainstream is environmentally friendly low-VOC ink products, which contain no organic solvents such as toluene and MEK (methyl ethyl ketone). There is a need for fine-grained pigments that disperse well even in environmentally friendly ink systems, which are free from the organic solvents that have conventionally been used as dispersants for fine-grained pigments, such as toluene and MEK.

A pigment for use as a coloring agent needs to have high color strength, high chroma, and high dispersion stability. To achieve the high color strength and high chroma, pigments having small grain diameters with a narrow grain size distribution are desirable. The dispersion stability is achieved through the use of pigment surface modifiers and treatment with a derivative.

In a process described in the literature, two quinacridone compounds are ground in the presence of an effective solubilizing amount of an alcohol and a base, and the resulting solid solution is isolated. With this process, however, dispersion stability is difficult to achieve. The color strength and chroma of the quinacridone pigment produced are not high either (PTL 1).

In a process set forth in the literature for the production of a quinacridone, a quinacridone derivative, and a quinacridone solid solution, oxidation is performed in the presence of a base, dimethylsulfoxide, water, and a catalyst. This process, too, fails to achieve sufficient color strength (PTL 2).

A proposed quinacridone solid-solution pigment contains an unsubstituted quinacridone and 4,11-dichloroquinacridone and exhibits characteristic peaks in X-ray diffraction. This pigment, likewise, does not meet requirements for the chroma and color strength characteristics (PTL 3).

CITATION LIST

Patent Literature

PTL 1: Japanese Unexamined Patent Application Publication No. 2-38463
PTL 2: Japanese Unexamined Patent Application Publication No. 5-230384
PTL 3: Japanese Unexamined Patent Application Publication No. 2002-146224

SUMMARY OF INVENTION

Technical Problem

The present invention provides a process for the production of a quinacridone pigment composition. For use in environmentally friendly inks, the pigment composition offers high chroma, high color strength, and high dispersion stability. Also provided is a water- or alcohol-based environmentally friendly ink that contains a quinacridone pigment composition obtained through this process.

Solution to Problem

After extensive research in view of the above circumstances, the inventors found that adding a quinacridone derivative to a quinacridone solid solution in two different steps in a process, during and after treatment for the control of crystals, gives the resulting pigment composition the color characteristics of high color strength and a high chroma, as well as high dispersion stability. The present invention is based on these findings.

That is, the present invention relates to a process for producing a quinacridone pigment composition containing a quinacridone solid solution and a quinacridone derivative, the process including:

(step A) heating, at 80° C. to 150° C., a pigment slurry composed of 100 parts of a cyclization-derived crude quinacridone solid solution, 0.1 to 10 parts of a quinacridone pigment derivative, and 500 to 1500 parts of an organic solvent and/or water; and (step B) obtaining the quinacridone pigment composition by, after step A, removing the organic solvent from the system, adding 0.5 to 15 parts of a quinacridone derivative for 100 parts of the quinacridone solid solution, and isolating and drying the product;

a process according to Claim 1 for producing a quinacridone pigment composition in which the crude quinacridone solid solution contains C.I. Pigment Red 122 and C.I. Pigment Red 19;

a process for producing a quinacridone pigment composition in which the crude quinacridone solid solution contains 1 to 100 parts of C.I. Pigment Red 19 for 100 parts of C.I. Pigment Red 122;

a process for producing a quinacridone pigment composition in which the quinacridone derivative is a salt of quinacridone sulfonic acid;

a process according to Claim 4 for producing a quinacridone pigment composition in which the quinacridone derivative is a salt of quinacridone sulfonic acid represented by general formula (1) below:

[Chem. 1]

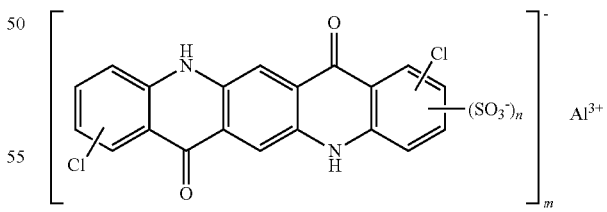

(1)

(where n is from 1 to 3, and m is from 1 to 3); and a water- or alcohol-based ink that contains a quinacridone pigment composition obtained through the above process for producing a quinacridone pigment composition.

Advantageous Effects of Invention

The quinacridone pigment composition obtained through the process of the present invention for the production of a quinacridone pigment composition offers a significant technical advantage when used as a coloring agent in ink. The composition makes the ink environmentally friendly one that combines high chroma, high color strength, and high dispersion stability.

DESCRIPTION OF EMBODIMENTS

Figure 1:
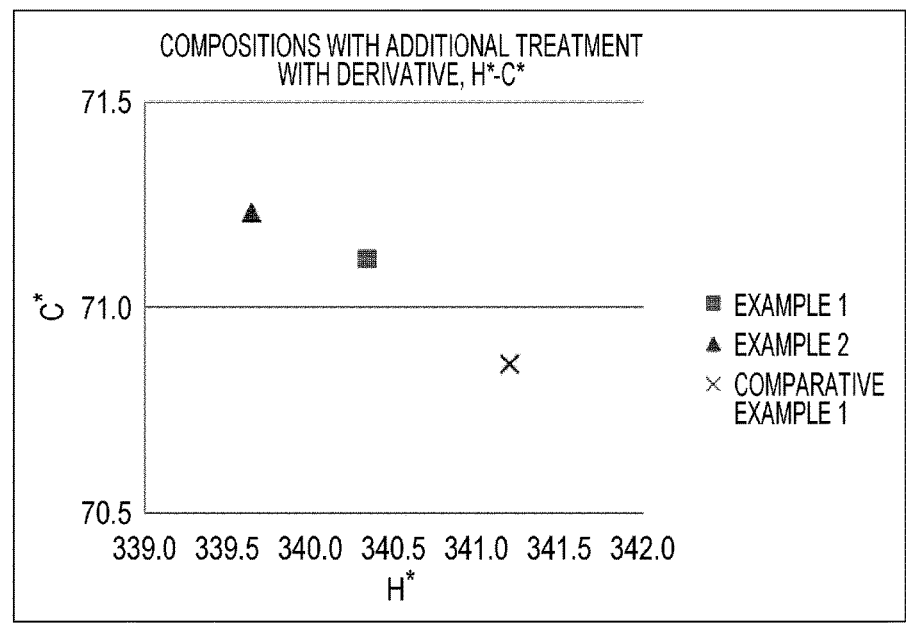
FIG. 1 illustrates the hue angle (H*) and chroma (C*) of pigment compositions obtained through a process according to the present invention as measured in a toluene-free polyamide/nitrocellulose gravure printing test.
Figure 2:
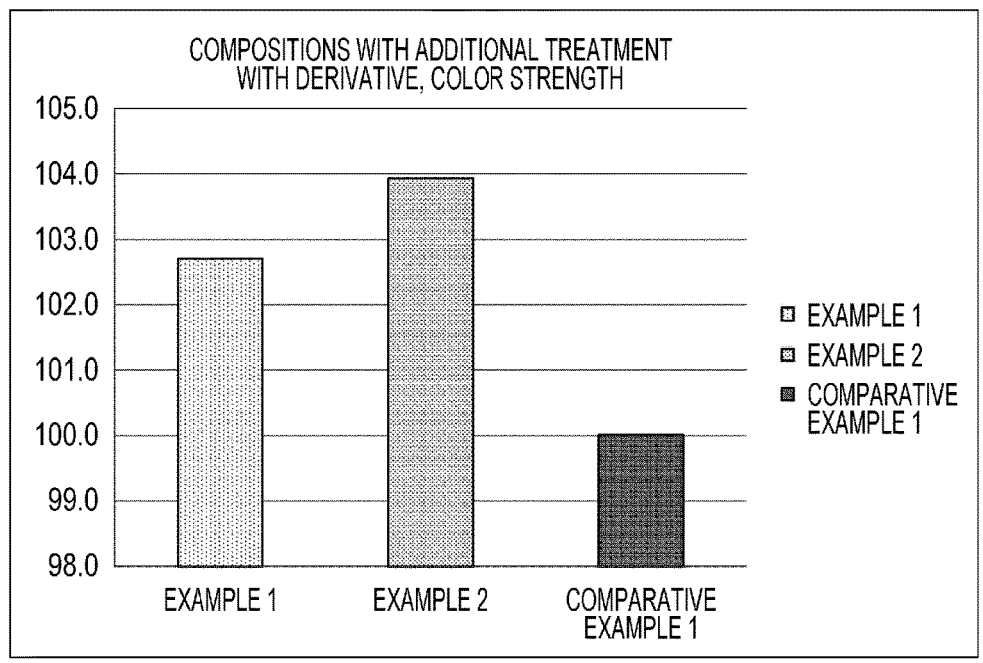
FIG. 2 illustrates the color strength of pigment compositions obtained through a process according to the present invention as measured in a toluene-free polyamide/nitrocellulose gravure printing test.
Figure 3:
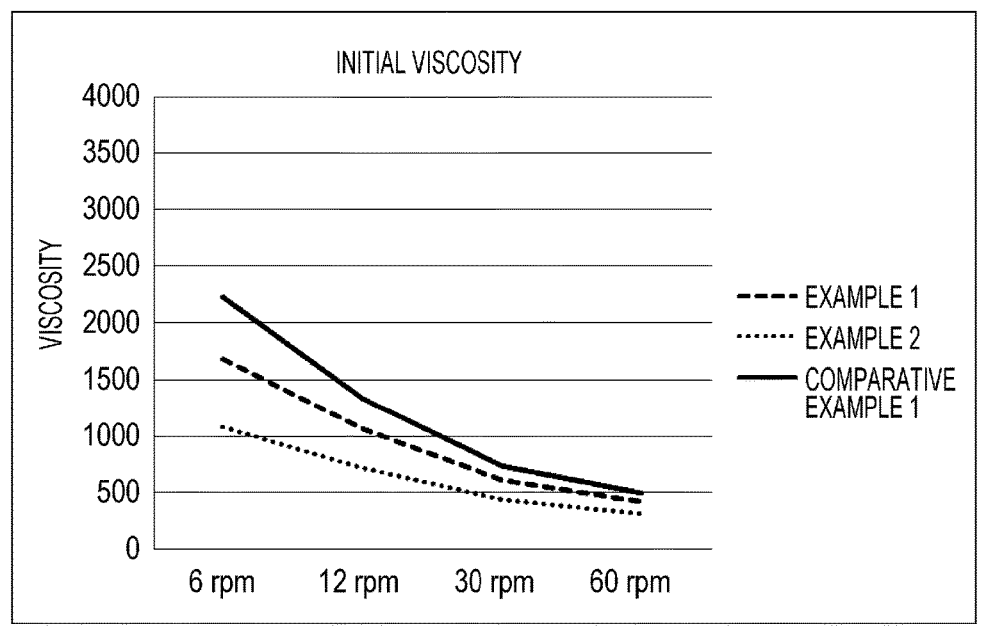
FIG. 3 illustrates the initial viscosity of inks using pigment compositions obtained through a process according to the present invention as measured in a toluene-free polyamide/nitrocellulose gravure printing test.
Figure 4:
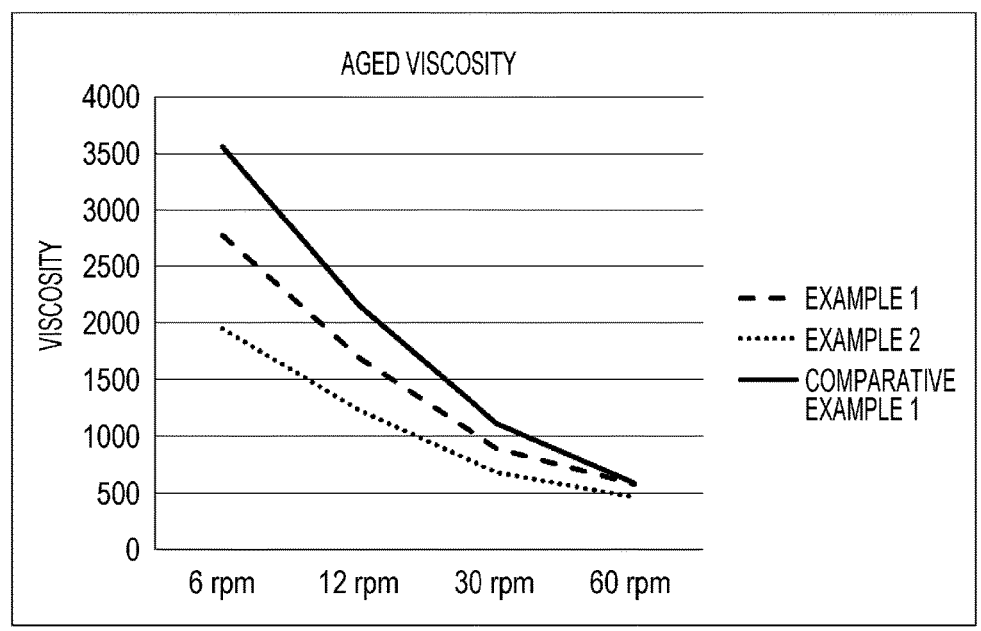
FIG. 4 illustrates the aged viscosity of inks using pigment compositions obtained through a process according to the present invention as measured in a toluene-free polyamide/nitrocellulose gravure printing test.
Figure 5:
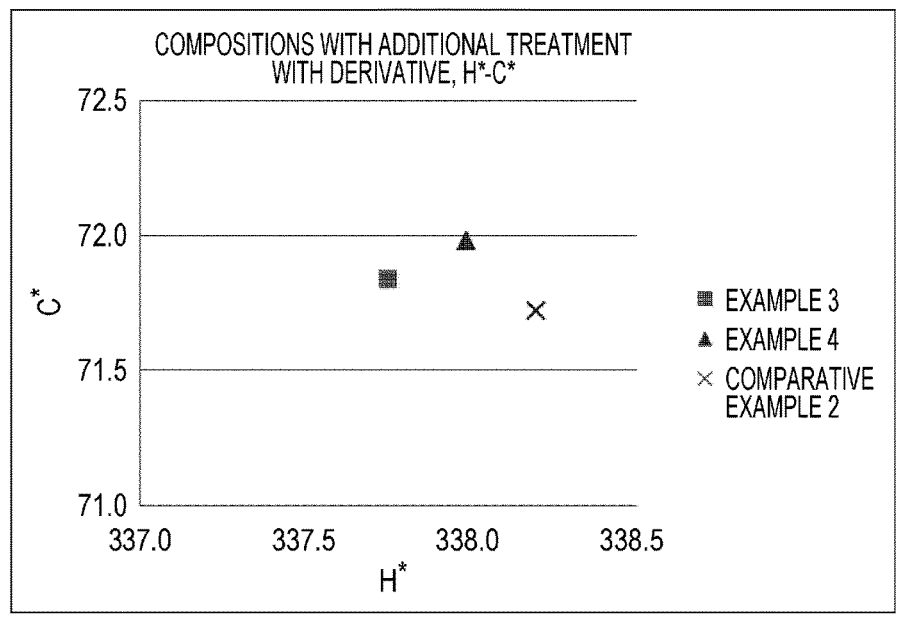
FIG. 5 illustrates the hue angle (H*) and chroma (C*) of pigment compositions obtained through a process according to the present invention as measured in a toluene-free polyamide/nitrocellulose gravure printing test.
Figure 6:
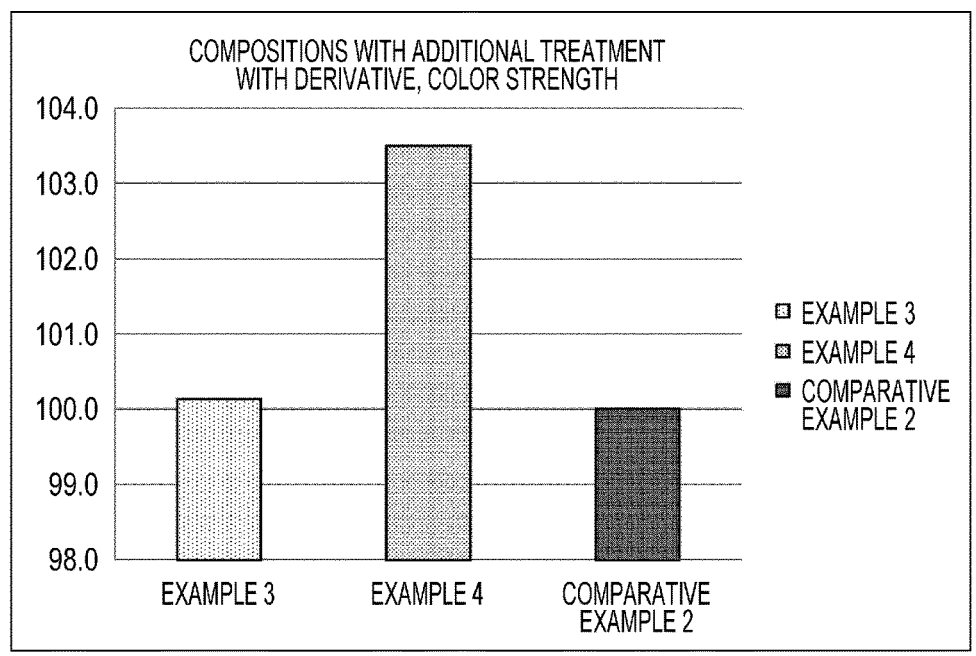
FIG. 6 illustrates the color strength of pigment compositions obtained through a process according to the present invention as measured in a toluene-free polyamide/nitrocellulose gravure printing test.
Figure 7:
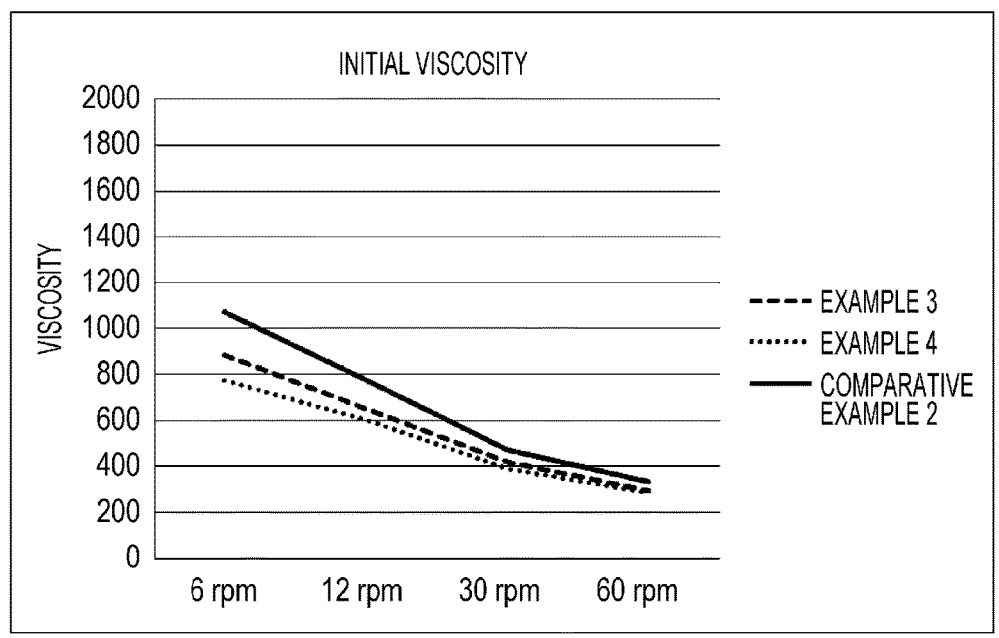
FIG. 7 illustrates the initial viscosity of inks using pigment compositions obtained through a process according to the present invention as measured in a toluene-free polyamide/nitrocellulose gravure printing test.
Figure 8:
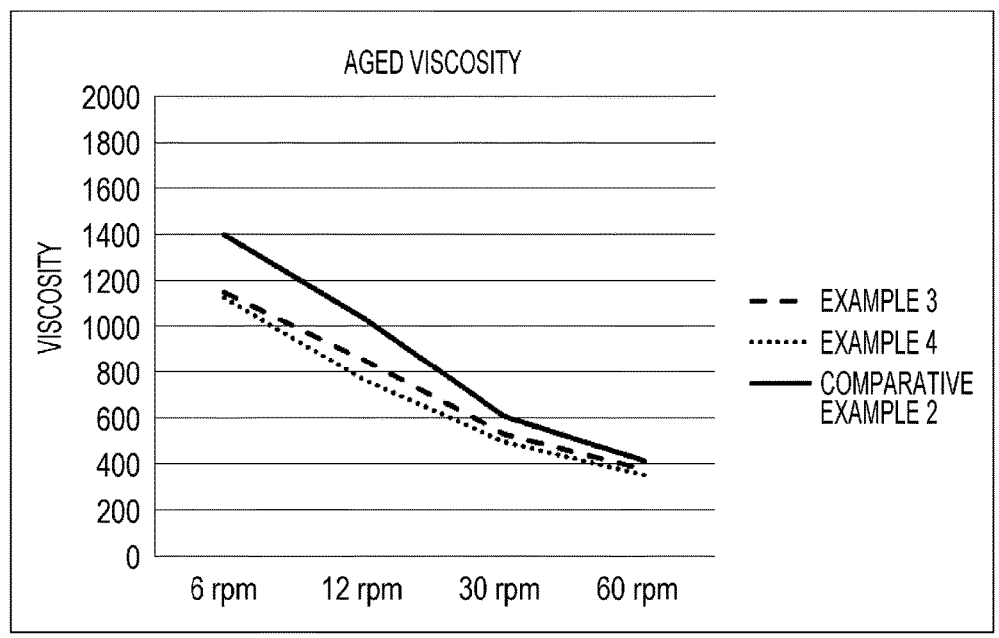
FIG. 8 illustrates the aged viscosity of inks using pigment compositions obtained through a process according to the present invention as measured in a toluene-free polyamide/nitrocellulose gravure printing test.

The following describes the details of the present invention.

In the process according to the present invention for producing a quinacridone pigment composition, the resulting quinacridone solid solution is one in which C.I. Pigment Violet 19 and C.I. Pigment Red 122, major components of the solid solution, form a mixed phase. The solid solution may further contain C.I. Pigment Red 202 and/or other compounds of quinacridone series, compounds having the quinacridone structure. The quinacridone solid solution obtained through the production process of the present invention exhibits unique X-ray diffraction peaks, peaks at Bragg angles at which single crystals of the individual quinacridone structures exhibit no peaks. By powder X-ray diffractometry, therefore, it is therefore easy to determine whether the product is a solid solution or a mixture of single crystals.

The quinacridone solid solution used in the present invention can be produced by known methods. Specific examples include the following methods:

(1) Dehydratively cyclizing raw material terephthalic acid in polyphosphoric acid, putting the product into water, and then isolating the precipitate by filtration and washing it with water;

(2) Dissolving a quinacridone (A) and a structurally different quinacridone (B) in polyphosphoric acid or concentrated sulfuric acid, putting the product into water, and then isolating the precipitate by filtration and washing it with water.

The relative amounts of C.I. Pigment Violet 19 and C.I. Pigment Red 122 in the quinacridone solid solution are 1 to 100 parts of C.I. Pigment Red 19 for 100 parts of C.I. Pigment Red 122. Considering hue and dispersibility, it is preferred that the relative amount of C.I. Pigment Red 19 be between 15 and 50 parts. In order for the ink to meet requirements for the color strength and chroma characteristics, it is more preferred that the relative amount of C.I. Pigment Red 19 be between 20 and 40 parts.

In the process according to the present invention for producing a quinacridone pigment composition, the solvent for the preparation of the solid solution can be an organic solvent and/or water.

The process according to the present invention for producing a quinacridone pigment composition gives a quinacridone pigment composition composed of this quinacridone solid solution and a quinacridone derivative.

A process according to the present invention for producing a quinacridone pigment composition includes:

(step A) heating, at 80° C. to 150° C., a pigment slurry composed of 100 parts of a cyclization-derived crude quinacridone solid solution, 0.1 to 10 parts, preferably 1 to 6 parts, more preferably 3 to 5 parts of a quinacridone pigment derivative, and 500 to 1500 parts of an organic solvent and/or water; and (step B) obtaining the quinacridone pigment composition by, after step A, removing the organic solvent from the system, adding 0.5 to 15 parts, preferably 1 to 10 parts, more preferably 3 to 6 parts of a quinacridone derivative for 100 parts of the quinacridone solid solution, and isolating and drying the product.

A process for the production of a quinacridone pigment composition generally includes treatment with solvent for the control of the crystal growth and grain size in a quinacridone solid solution, and the greatest feature of the present invention is that a quinacridone derivative is added in two different steps in the process, during treatment with solvent (step A) and after the solvent is removed (step B), to combine dispersion and storage stability with color strength and chroma. Step A limits the grain size, giving the composition high color strength and high chroma. The next step, B, prevents the pigment grains, very small in size, from flocculating together, combining good dispersibility and high storage stability with the advantages given in step A.

In the step of adding a quinacridone derivative, adding the quinacridone derivative only in step A would be enough to limit the growth of the crystals of the quinacridone solid-solution pigment and to obtain fine-grained pigment crystals with high color strength and high chroma. Limiting the grain size, however, means increasing the surface free energy of the grains. In an ink performance testing, for example, of the resulting composition, the high surface free energy would cause the pigment grains to flocculate quickly, not only spoiling the advantages of limiting the grain size, high color strength and high chroma, but also significantly affecting dispersion and storage stability.

Adding the quinacridone derivative only in step B would be enough to ensure low initial and aged viscosities, high dispersion, and high storage stability of the resulting composition in an ink performance testing. This composition would, however, be inferior in color strength and chroma, because of the grain diameters larger than those of pigment crystals whose size is limited in step A.

As a solution, step A, for limiting the grain size, and step B, for preventing the pigment crystals from flocculating together, are combined. This gives the resulting pigment composition high color strength and high chroma combined with good dispersion and high dispersion stability.

In (step A), treatment with solvent, in the production process according to the present invention, the solvent can be an organic solvent and/or water. A water-butanol system is preferred for the control of the grain size. The amount of the solvent is between 500 and 2000 parts for 100 parts of the quinacridone solid solution. Considering economic efficiency, it is more preferred that the amount of the solvent be between 500 and 1500 parts.

In (step A), the quinacridone derivative can be an aluminum salt of dichloroquinacridone sulfonic acid, a compound represented by general formula (1).

In (step B), the quinacridone derivative can be an aluminum salt of dichloroquinacridone sulfonic acid, a compound represented by general formula (1).

In (step A), the amount of the quinacridone derivative is between 0.1 and 10 parts, preferably between 1 and 6 parts, more preferably between 3 and 5 parts, for 100 parts of the quinacridone solid solution.

Salts of quinacridone sulfonic acid are quinacridone derivatives having a structure represented by the following general formula:

[Chem. 2]

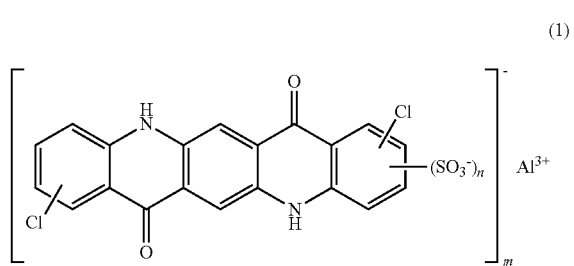

(1)

(where n is from 1 to 3, and m is from 1 to 3).

In (step A), the reaction can be performed at any temperature, and can be terminated at any time after the desired grain size and grain size distribution are obtained.

In the treatment with solvent, an inorganic base may optionally be used, such as sodium hydroxide or potassium hydroxide.

When the quinacridone derivative is added to the quinacridone solid solution, it is preferred that the quinacridone solid solution be treated not in dry form but as a wet cake obtained by washing the synthesized solid solution with water or solvent. This ensures the solid solution is treated uniformly in the solvent as mentioned above.

In (step B), the quinacridone derivative can be structurally the same as or different from that used in (step A). The amount of the quinacridone derivative is the manufacturer's choice, but preferably is equal to or larger than that in (step A), as this is more effective in improving color strength. A range of amounts preferred for hue is 0.5 to 15 parts for 100 parts of the quinacridone solid solution. It is preferred that the amount of the quinacridone derivative be between 1 and 10 parts, more preferably between 3 and 6 parts.

In (step B), the quinacridone derivative can be added upon the start of solvent removal or during the solvent removal.

In (step B), the temperature at which the solvent is distilled away depends on the kind of solvent used. Naturally, however, this temperature is equal to or higher than the boiling point of the solvent so that the solvent is removed from the system. The distillation is continued until no more distillate comes over.

After the end of (step B), the product is isolated by filtration, dried, and ground by known methods, giving a quinacridone pigment composition.

The resulting quinacridone pigment composition, obtained by a production process according to the present invention, is suitable for use in an environmentally friendly ink and can be used as a coloring material. An environmentally friendly ink is a generic term for a low-VOC (volatile organic compounds) ink free from organic solvents such as toluene and MEK (methyl ethyl ketone).

In the environmentally friendly ink, the quinacridone pigment composition obtained through a production process according to the present invention is present in an amount of 5% to 20%, giving the ink very high color strength. An example of a method for dispersing the quinacridone pigment composition in the ink is the use of a known dispersing machine. Using such a machine, the pigment composition can be uniformly dispersed in a vehicle to give the ink.

The quinacridone pigment composition obtained through a production process according to the present invention can be used as a coloring material in known applications in which coloring materials are used, such as printing inks, paints, coloring materials for plastics, coloring materials for toners, and coloring materials for color filters.

EXAMPLES

The following describes the present invention on the basis of examples. All parts and % are by mass, unless otherwise specified.

Example 1

In a 2-L separable flask, 230.0 g of 85% phosphoric acid (Rasa Industries, Ltd.) was stirred with 330.0 g of phosphoric anhydride (Rasa Industries, Ltd.), giving an 84.2% polyphosphoric acid. After the internal temperature decreased to approximately 100° C., 160.0 g of DTTA (2,5-di-p-toluidinoterephthalic acid), the raw material for C.I. Pigment Red 122, was gradually added, and then so was 40.0 g of DATA (2,5-dianilinoterephthalic acid), the raw material for C.I. Pigment Violet 19. After all was added, condensation was allowed to proceed at 125° C. for 3 hours. After the end of the reaction, the solution was put into 3 L of water at 30° C. in a 5-L stainless steel cup. The precipitate was isolated by filtration and washed with water, giving a crude solid-solution pigment.

Sixty grams of this crude solid-solution pigment was heated with 600 g of a 33% aqueous solution of isobutanol and 1.8 g of an aluminum salt of dichloroquinacridone sulfonic acid (step A) at 114° C. for 5 hours, giving a pigment composition. The isobutanol was distilled away, and to 61.8 g of the residual pigment composition was added 1.2 g of an aluminum salt of dichloroquinacridone sulfonic acid (step B). The ingredients were dispersed by stirring at 60° C. for 30 minutes. The solid was isolated by filtration using a Nutsche filter, washed with 3 L of water, dried at 98° C. for 12 hours, and ground, giving the pigment composition of (Example 1).

Example 2

In a 2-L separable flask, 230.0 g of 85% phosphoric acid (Rasa Industries, Ltd.) was stirred with 330.0 g of phosphoric anhydride (Rasa Industries, Ltd.), giving an 84.2% polyphosphoric acid. After the internal temperature decreased to approximately 100° C., 160.0 g of DTTA (2,5-di-p-toluidinoterephthalic acid), the raw material for C.I. Pigment Red 122, was gradually added, and then so was 40.0 g of DATA (2,5-dianilinoterephthalic acid), the raw material for C.I. Pigment Violet 19. After all was added, condensation was allowed to proceed at 125° C. for 3 hours. After the end of the reaction, the solution was put into 3 L of water at 30° C. in a 5-L stainless steel cup. The precipitate was isolated by filtration and washed with water, giving a crude solid-solution pigment.

Sixty grams of this crude solid-solution pigment was heated with 600 g of a 33% aqueous solution of isobutanol and 1.8 g of an aluminum salt of dichloroquinacridone sulfonic acid (step A) at 114° C. for 5 hours, giving a pigment composition. The isobutanol was distilled away, and to 61.8 g of the residual pigment composition was added 3.1 g of an aluminum salt of dichloroquinacridone sulfonic acid (step B). The ingredients were dispersed by stirring at 60° C. for 30 minutes. The solid was isolated by filtration using a Nutsche filter, washed with 3 L of water, dried at 98° C. for 12 hours, and ground, giving the pigment composition of (Example 2).

Comparative Example 1

In a 2-L separable flask, 230.0 g of 85% phosphoric acid (Rasa Industries, Ltd.) was stirred with 330.0 g of phosphoric anhydride (Rasa Industries, Ltd.), giving an 84.2% polyphosphoric acid. After the internal temperature decreased to approximately 100° C., 160.0 g of DTTA (2,5-di-p-toluidinoterephthalic acid), the raw material for C.I. Pigment Red 122, was gradually added, and then so was 40.0 g of DATA (2,5-dianilinoterephthalic acid), the raw material for C.I. Pigment Violet 19. After all was added, condensation was allowed to proceed at 125° C. for 3 hours. After the end of the reaction, the solution was put into 3 L of water at 30° C. in a 5-L stainless steel cup. The precipitate was isolated by filtration and washed with water, giving a crude solid-solution pigment.

Sixty grams of this crude solid-solution pigment was heated with 600 g of a 33% aqueous solution of isobutanol and 1.8 g of an aluminum salt of dichloroquinacridone sulfonic acid (step A) at 114° C. for 5 hours, giving a pigment composition. The isobutanol was distilled away, and the residual solid was isolated by filtration using a Nutsche filter, washed with 3 L of water, dried at 98° C. for 12 hours, and ground, giving the pigment composition of (Comparative Example 1) (no step B).

The pigment compositions obtained in Examples 1 and 2 and Comparative Example 1 were tested.

[Test Method 1: Toluene-Free Polyamide/Nitrocellulose Gravure Printing Test]

Table 1 presents the formulation of the gravure inks used.

TABLE 1

| | |
|---|---|
| Pigment | 9.9% |
| PA varnish | 60.4% |
| NC varnish | 12.9% |
| Solvent mixture | 16.8% |
| Total | 100.0% |

In Table 1, the PA varnish is a solution of 100 parts of polyamide resin in 118 parts of isopropyl alcohol. The NC varnish is a solution of 30 parts of nitrocellulose resin in 100 parts of ethyl acetate. The solvent mixture is a mixture of 100 parts of IPA and 89 parts of ethyl acetate.

In a 100-ml polyethylene bottle, 4.5 g of the pigment, 30 g of the PA varnish, 6.5 g of the NC varnish, and 100 g of ⅛-inch glass beads are dispersed for 1 hour using a paint conditioner. After the 1-hour dispersion, 8.5 g of the mixed solvent was added to the 100-ml polyethylene bottle, and the ingredients were dispersed for 10 minutes using the paint conditioner to give a toluene-free polyamide/nitrocellulose gravure ink. If color comparison and hue measurement are performed, the ink is spread over an acetate film using RDS Bar Coater No. 6 (RDS).

TABLE 2

| | C* | h* |
|---|---|---|
| Example 1 | 71.12 | 340.34 |
| Example 2 | 71.23 | 339.65 |
| Comparative Example 1 | 70.86 | 341.20 |

As can be seen from Table 2, Examples 1 and 2, in which the solid solution was additionally treated with an aluminum salt of dichloroquinacridone sulfonic acid, were superior to Comparative Example 1 in chroma, owing to better dispersion. The viscosity measurements were taken using RB-85L Model R85 Viscometer and No. 12 rotor (Toki Sangyo Co., Ltd.). The initial viscosity is a viscosity of the ink as measured after the 100-ml polyethylene bottle is left in a temperature-controlled bath at 20° C. for 1 hour with the ⅛-inch glass beads removed beforehand. The aged viscosity is a viscosity of the ink as measured after the 100-ml polyethylene bottle following the initial viscosity measurement is left in a temperature-controlled drying oven at 50° C. for 7 days. The hue and chroma values are measurements taken using datacolor 650 (datacolor).

TABLE 3

| | Color strength (%) |
|---|---|
| Example 1 | 102.7 |
| Example 2 | 103.9 |
| Comparative Example 1 | 100.0 |

As is clear from Table 3, Examples 1 and 2, in which the solid solution was additionally treated with an aluminum salt of dichloroquinacridone sulfonic acid, were superior to Comparative Example 1 in color strength, too, in association with better dispersion.

TABLE 4

| | Initial ink viscosity | | | |
|---|---|---|---|---|
| Rotor No. 12 | 6 rpm | 12 rpm | 30 rpm | 60 rpm |
| Example 1 | 1685 | 1055 | 605 | 413.5 |
| Example 2 | 1075 | 715 | 439 | 309 |
| Comparative Example 1 | 2230 | 1330 | 733 | 490 |

In Examples 1 and 2, in which the solid solution was additionally treated with an aluminum salt of dichloroquinacridone sulfonic acid, the initial ink viscosity decreased compared with that in Comparative Example 1, in which an aluminum salt of dichloroquinacridone sulfonic acid was added only in step A, in inverse proportion to the amount of salt added. This indicates that aluminum salts of dichloroquinacridone sulfonic acid are effective in improving rheology.

TABLE 5

| | Aged ink viscosity | | | |
|---|---|---|---|---|
| | 6 rpm | 12 rpm | 30 rpm | 60 rpm |
| Example 1 | 2775 | 1695 | 898 | 580.5 |
| Example 2 | 1945 | 1233 | 686 | 461.5 |
| Comparative Example 1 | 3560 | 2155 | 1118 | 582.5 |

The aged ink viscosity refers to a viscosity of the ink as measured after the ink was left in a temperature-controlled drying oven at 50° C. for 7 days after the measurement of the initial ink viscosity.

The aged ink viscosity, too, decreased in Examples 1 and 2, in which the solid solution was additionally treated with an aluminum salt of dichloroquinacridone sulfonic acid, as compared with Comparative Example 1, in which an aluminum salt of dichloroquinacridone sulfonic acid was added only in step A. Besides being effective in improving rheology, therefore, aluminum salts of dichloroquinacridone sulfonic acid help stabilize dispersion.

Example 3

In a 2-L separable flask, 230.0 g of 85% phosphoric acid (Rasa Industries, Ltd.) was stirred with 330.0 g of phosphoric anhydride (Rasa Industries, Ltd.), giving an 84.2% polyphosphoric acid. After the internal temperature decreased to approximately 100° C., 160.0 g of DTTA (2,5-di-p-toluidinoterephthalic acid), the raw material for C.I. Pigment Red 122, was gradually added, and then so was 40.0 g of DATA (2,5-dianilinoterephthalic acid), the raw material for C.I. Pigment Violet 19. After all was added, condensation was allowed to proceed at 125° C. for 3 hours. After the end of the reaction, the solution was put into 3 L of water at 30° C. in a 5-L stainless steel cup. The precipitate was isolated by filtration and washed with water, giving a crude solid-solution pigment.

Sixty grams of this crude solid-solution pigment was heated with 600 g of a 65% aqueous solution of NMP (n-methyl-2-pyrrolidone) and 1.8 g of an aluminum salt of dichloroquinacridone sulfonic acid (step A) at 100° C. for 4 hours, giving a pigment composition. The aqueous solution of NMP and the solid are separated by filtration using a Nutsche filter, the solid is washed with 3 L of water, and 61.8 g of the washed pigment composition is reslurried in 600 g of water. To the resulting slurry was added 1.2 g of an aluminum salt of dichloroquinacridone sulfonic acid (step B). The ingredients were dispersed by stirring at 60° C. for 30 minutes. The solid was isolated by filtration using a Nutsche filter, washed with 3 L of water, dried at 98° C. for 12 hours, and ground, giving the pigment composition of (Example 3).

Example 4

In a 2-L separable flask, 230.0 g of 85% phosphoric acid (Rasa Industries, Ltd.) was stirred with 330.0 g of phosphoric anhydride (Rasa Industries, Ltd.), giving an 84.2% polyphosphoric acid. After the internal temperature decreased to approximately 100° C., 160.0 g of DTTA (2,5-di-p-toluidinoterephthalic acid), the raw material for C.I. Pigment Red 122, was gradually added, and then so was 40.0 g of DATA (2,5-dianilinoterephthalic acid), the raw material for C.I. Pigment Violet 19. After all was added, condensation was allowed to proceed at 125° C. for 3 hours. After the end of the reaction, the solution was put into 3 L of water at 30° C. in a 5-L stainless steel cup. The precipitate was isolated by filtration and washed with water, giving a crude solid-solution pigment.

Sixty grams of this crude solid-solution pigment was heated with 600 g of a 65% aqueous solution of NMP (n-methyl-2-pyrrolidone) and 1.8 g of an aluminum salt of dichloroquinacridone sulfonic acid (step A) at 100° C. for 4 hours, giving a pigment composition. The aqueous solution of NMP and the solid are separated by filtration using a Nutsche filter, the solid is washed with 3 L of water, and 61.8 g of the washed pigment composition is reslurried in 600 g of water. To the resulting slurry was added 1.8 g of an aluminum salt of dichloroquinacridone sulfonic acid (step B). The ingredients were dispersed by stirring at 60° C. for 30 minutes. The solid was isolated by filtration using a Nutsche filter, washed with 3 L of water, dried at 98° C. for 12 hours, and ground, giving the pigment composition of (Example 4).

Comparative Example 2

In a 2-L separable flask, 230.0 g of 85% phosphoric acid (Rasa Industries, Ltd.) was stirred with 330.0 g of phosphoric anhydride (Rasa Industries, Ltd.), giving an 84.2% polyphosphoric acid. After the internal temperature decreased to approximately 100° C., 160.0 g of DTTA (2,5-di-p-toluidinoterephthalic acid), the raw material for C.I. Pigment Red 122, was gradually added, and then so was 40.0 g of DATA (2,5-dianilinoterephthalic acid), the raw material for C.I. Pigment Violet 19. After all was added, condensation was allowed to proceed at 125° C. for 3 hours. After the end of the reaction, the solution was put into 3 L of water at 30° C. in a 5-L stainless steel cup. The precipitate was isolated by filtration and washed with water, giving a crude solid-solution pigment.

Sixty grams of this crude solid-solution pigment was heated with 600 g of a 65% aqueous solution of NMP (n-methyl-2-pyrrolidone) and 1.8 g of an aluminum salt of dichloroquinacridone sulfonic acid (step A) at 100° C. for 4 hours, giving a pigment composition. The aqueous solution of NMP and the solid are separated by filtration using a Nutsche filter, the solid is washed with 3 L of water, and 61.8 g of the washed pigment composition is reslurried in 600 g of water. The composition in the resulting slurry was dispersed and washed by stirring at 60° C. for 30 minutes. The solid was isolated by filtration using a Nutsche filter, washed with 3 L of water, dried at 98° C. for 12 hours, and ground, giving the pigment composition of (Comparative Example 2).

The pigment compositions obtained in Examples 3 and 4 and Comparative Example 2 were tested.

[Test Method 1: Toluene-Free Polyamide/Nitrocellulose Gravure Printing Test]

Table 6 presents the formulation of the gravure inks used.

TABLE 6

| Pigment | 9.9% |
|---|---|
| PA varnish | 60.4% |
| NC varnish | 12.9% |
| Solvent mixture | 16.8% |
| Total | 100.0% |

In Table 6, the PA varnish is a solution of 100 parts of polyamide resin in 118 parts of isopropyl alcohol. The NC varnish is a solution of 30 parts of nitrocellulose resin in 100 parts of ethyl acetate. The solvent mixture is a mixture of 100 parts of IPA and 89 parts of ethyl acetate.

In a 100-ml polyethylene bottle, 4.5 g of the pigment, 30 g of the PA varnish, 6.5 g of the NC varnish, and 100 g of ⅛-inch glass beads are dispersed for 1 hour using a paint conditioner. After the 1-hour dispersion, 8.5 g of the mixed solvent was added to the 100-ml polyethylene bottle, and the ingredients were dispersed for 10 minutes using the paint conditioner to give a toluene-free polyamide/nitrocellulose gravure ink. If color comparison and hue measurement are performed, the ink is spread over an acetate film using RDS Bar Coater No. 6 (RDS).

TABLE 7

|  | C* | h* |
|---|---|---|
| Example 3 | 71.84 | 338.02 |
| Example 4 | 71.98 | 338.11 |
| Comparative Example 2 | 71.67 | 337.99 |

As can be seen from Table 7, Examples 3 and 4, in which the solid solution was additionally treated with an aluminum salt of dichloroquinacridone sulfonic acid, were superior to Comparative Example 2 in chroma, owing to better dispersion. The viscosity measurements were taken using RB-85L Model R85 Viscometer and No. 12 rotor (Toki Sangyo Co., Ltd.). The initial viscosity is a viscosity of the ink as measured after the 100-ml polyethylene bottle is left in a temperature-controlled bath at 20° C. for 1 hour with the ⅛-inch glass beads removed beforehand. The aged viscosity is a viscosity of the ink as measured after the 100-ml polyethylene bottle following the initial viscosity measurement is left in a temperature-controlled drying oven at 50° C. for 7 days. The hue and chroma values are measurements taken using datacolor 650 (datacolor).

TABLE 8

|  | Color strength (%) |
|---|---|
| Example 3 | 100.1 |
| Example 4 | 103.5 |
| Comparative Example 2 | 100 |

As is clear from Table 8, Examples 3 and 4, in which the solid solution was additionally treated with an aluminum salt of dichloroquinacridone sulfonic acid, were superior to Comparative Example 1 in color strength, too, in association with better dispersion.

TABLE 9

|  | Initial ink viscosity | | | |
|---|---|---|---|---|
| Rotor No. 12 | 6 rpm | 12 rpm | 30 rpm | 60 rpm |
| Example 3 | 885 | 648 | 417 | 292.5 |
| Example 4 | 775 | 603 | 388 | 285.0 |
| Comparative Example 2 | 1070 | 775 | 473 | 334.5 |

In Examples 3 and 4, in which the solid solution was additionally treated with an aluminum salt of dichloroquinacridone sulfonic acid, the initial ink viscosity decreased compared with that in Comparative Example 2, in which an aluminum salt of dichloroquinacridone sulfonic acid was added only in step A, in inverse proportion to the amount of salt added. This indicates that aluminum salts of dichloroquinacridone sulfonic acid are effective in improving rheology.

TABLE 10

|  | Aged ink viscosity | | | |
|---|---|---|---|---|
|  | 6 rpm | 12 rpm | 30 rpm | 60 rpm |
| Example 3 | 1150 | 848 | 528 | 375.5 |
| Example 4 | 1125 | 765 | 497 | 349.5 |
| Comparative Example 2 | 1395 | 1033 | 604 | 415.5 |

The aged ink viscosity refers to a viscosity of the ink as measured after the ink was left in a temperature-controlled drying oven at 50° C. for 7 days after the measurement of the initial ink viscosity.

The aged ink viscosity, too, decreased in Examples 3 and 4, in which the solid solution was additionally treated with an aluminum salt of dichloroquinacridone sulfonic acid, as compared with Comparative Example 3, in which an aluminum salt of dichloroquinacridone sulfonic acid was added only in step A. Besides being effective in improving rheology, therefore, aluminum salts of dichloroquinacridone sulfonic acid help stabilize dispersion.

The invention claimed is:

1. A process for producing a quinacridone pigment composition containing a quinacridone solid solution and a quinacridone derivative, the process comprising:
    (step A) heating, at 80° C. to 150° C., a pigment slurry composed of 100 parts of a cyclization-derived crude quinacridone solid solution, 0.1 to 10 parts of a quinacridone pigment derivative, and 500 to 1500 parts of organic solvent and/or water; and
    (step B) obtaining the quinacridone pigment composition by, after step A, removing the organic solvent from a system, adding 0.5 to 15 parts of a quinacridone derivative for 100 parts of the quinacridone solid solution, and isolating and drying a product,
    wherein the quinacridone derivative is a salt of quinacridone sulfonic acid represented by general formula (1) below:

[Chem. 1]

$$\left[ \begin{array}{c} \text{(quinacridone-Cl}_2\text{ structure)} \end{array} (SO_3^-)_n \right] Al^{3+}_m$$

(where n is from 1 to 3, and m is from 1 to 3).

2. The process according to claim 1 for producing a quinacridone pigment composition, wherein the crude quinacridone solid solution contains C.I. Pigment Red 122 and C.I. Pigment Red 19.

3. The process according to claim 2 for producing a quinacridone pigment composition, wherein the crude quinacridone solid solution contains 1 to 100 parts of C.I. Pigment Red 19 for 100 parts of C.I. Pigment Red 122.

4. A water- or alcohol-based ink comprising a quinacridone pigment composition obtained through the process according to claim 1 for producing a quinacridone pigment composition.

5. A water- or alcohol-based ink comprising a quinacridone pigment composition obtained through the process according to claim 2 for producing a quinacridone pigment composition.

6. A water- or alcohol-based ink comprising a quinacridone pigment composition obtained through the process according to claim 3 for producing a quinacridone pigment composition.

\* \* \* \* \*